United States Patent
Zimmerman et al.

(10) Patent No.: US 10,842,262 B2
(45) Date of Patent: Nov. 24, 2020

(54) TRAY ATTACHMENT ASSEMBLY

(71) Applicants: Tod Zimmerman, Paradise, CA (US); Doreen Zimmerman, Paradise, CA (US)

(72) Inventors: Tod Zimmerman, Paradise, CA (US); Doreen Zimmerman, Paradise, CA (US)

(*) Notice: Subject to any disclaimer, the term of this patent is extended or adjusted under 35 U.S.C. 154(b) by 0 days.

(21) Appl. No.: 16/226,024

(22) Filed: Dec. 19, 2018

(65) Prior Publication Data

US 2020/0196750 A1 Jun. 25, 2020

(51) Int. Cl.
| | |
|---|---|
| *A47B 23/02* | (2006.01) |
| *A47B 3/12* | (2006.01) |
| *A47B 13/00* | (2006.01) |
| *A47B 13/08* | (2006.01) |

(52) U.S. Cl.
CPC .............. *A47B 23/02* (2013.01); *A47B 3/12* (2013.01); *A47B 13/003* (2013.01); *A47B 13/081* (2013.01)

(58) Field of Classification Search
CPC ......... A47B 23/02; A47B 3/12; A47B 13/003; A47B 13/081
USPC ......... 108/27, 50.01, 90, 147.18, 42, 44–46, 108/151, 152, 157.11, 159.11
See application file for complete search history.

(56) References Cited

U.S. PATENT DOCUMENTS

| | | | | |
|---|---|---|---|---|
| 156,505 A | * | 11/1874 | Smith | |
| 264,748 A | * | 9/1884 | Potts | |
| 518,733 A | * | 4/1894 | Cook | |
| 979,070 A | * | 12/1910 | Hoffman | |
| 2,509,060 A | * | 5/1950 | Hoder | B60N 3/002 108/166 |
| 2,511,919 A | * | 6/1950 | Jones | A47B 17/03 312/208.1 |
| 2,695,831 A | * | 11/1954 | Sigal | A47B 88/407 312/246 |
| 2,709,563 A | * | 5/1955 | Starkey | A47B 1/04 248/231.85 |
| 2,710,051 A | * | 6/1955 | Greenberg | A47C 7/70 108/6 |
| 3,111,297 A | * | 11/1963 | Conner | E06C 7/14 108/147.18 |
| 3,336,642 A | * | 8/1967 | Armacost | B25B 5/06 24/523 |
| 5,351,897 A | * | 10/1994 | Martin | A47B 21/0314 248/118 |
| 5,833,180 A | * | 11/1998 | Baranowski | A47B 21/0371 248/118 |

(Continued)

*Primary Examiner* — Daniel J Troy
*Assistant Examiner* — Timothy M Ayres
(74) *Attorney, Agent, or Firm* — Dickinson Wright PLLC (57) ABSTRACT

A tray attachment assembly providing a horizontal surface for placement of items thereon. The assembly includes a tray that defines the horizontal surface and a connection mechanism for fixedly clamping the tray to an attachment surface. The tray includes a first planar section extending between a first lateral edge and a second lateral edge that defines the horizontal surface. A second planar section extends from the second lateral edge of the first planar section at a transverse angle from the first planar section for preventing unintended interaction with the connection mechanism. The transition between the first planar section and the second planar section presents a rounded profile.

15 Claims, 12 Drawing Sheets

(56) References Cited

U.S. PATENT DOCUMENTS

| | | | | |
|---|---|---|---|---|
| 6,079,336 | A * | 6/2000 | Lindstrom | A47B 96/022 108/42 |
| 6,082,838 | A * | 7/2000 | Bissu-Palombo | A47B 3/12 108/115 |
| 6,318,691 | B1 * | 11/2001 | Toth, Jr. | A45D 20/12 248/231.41 |
| 6,378,831 | B1 * | 4/2002 | Copeland, Jr. | A47B 13/083 108/27 |
| 6,910,429 | B1 * | 6/2005 | Matay | B25H 3/06 108/152 |
| 7,168,773 | B1 * | 1/2007 | Emary | A47B 88/70 312/246 |
| 7,740,312 | B2 * | 6/2010 | Johnson, Jr. | A47B 13/16 297/217.6 |
| 8,267,389 | B2 * | 9/2012 | Roesch | B25B 5/102 269/249 |
| 8,424,693 | B1 * | 4/2013 | Hoover | A47F 5/0062 211/126.15 |
| 8,561,550 | B2 * | 10/2013 | Raml | A47B 5/00 108/152 |
| 9,089,208 | B2 * | 7/2015 | Zimmerman | A47B 13/16 |
| D735,492 | S * | 8/2015 | Coffman | D6/555 |
| 9,155,427 | B1 * | 10/2015 | Kumar | A47J 47/005 |
| 10,066,783 | B2 * | 9/2018 | Shen | A47B 21/0314 |
| 2007/0007404 | A1 * | 1/2007 | Stravitz | A47B 21/0314 248/158 |
| 2009/0107368 | A1 * | 4/2009 | Austin | A47B 9/18 108/147.18 |

* cited by examiner

Fig-12

TRAY ATTACHMENT ASSEMBLY

BACKGROUND OF THE INVENTION

1. Field of the Invention

The present invention relates to a tray attachment assembly. More particularly, the present invention relates to a tray attachment assembly for providing a horizontal work surface for placement of items thereon.

2. Related Art

This section provides background information related to the present disclosure which is not necessarily prior art.

During the hustle and bustle of daily life, we rely heavily on the organizational benefits of tables and desks. For personal use, families gather around tables to eat, play games, and spend time together. For occupational needs, employees use desks or work surfaces for placing documents, tools, patients, et cetera. Whether for personal use or occupational need, there are often times situations where a table or work surface is not large enough or too awkwardly shaped to perform a given task, in these instances there is a desire to extend the surface without resorting to using multiple tables. One such example is in academia, where student desks provide a limited amount of surface that rarely simultaneously fit a laptop and paperwork.

Traditional tray attachments have allowed us to increase tables or work surfaces to a certain extent but have also revealed a number of shortcomings. For example, many traditional tray attachments are cumbersome and require multiple steps for attachment to a table or work surface, oftentimes these tray attachments further require permanent attachment by way of screwing. Even if not the permanent-type tray attachment, they are still prone to scratching and indenting tables based on rigid clamping mechanisms precluding their use on expensive tables or tables made of softer material. Another notable shortcoming of these traditional tray attachments is that they are prone to deformation or breaking under relatively light loads. These tray attachments are also only compatible with horizontal surfaces that are perfectly planar. One of the most notable shortcomings of these tray attachments is that they leave rigid clamps exposed on their undersides, creating a hazard to young children who are prone to kicking out and hurting themselves and/or dislodging the rigid clamps.

In accordance with these and other aspects, there is a desire to have a tray attachment that can be easily connected to a table, does not damage the table, and can prevent a user from accidentally dislodging the tray.

SUMMARY OF THE INVENTION

The subject invention provides an improved tray attachment assembly. The tray attachment assembly provides a horizontal surface for placement of items thereon. The assembly includes a tray that defines the horizontal surface and a connection mechanism for fixedly clamping the tray to an attachment surface. The tray includes a first planar section extending between a first lateral edge and a second lateral edge that delimit the horizontal surface. A second planar section extends from the second lateral edge of the first planar section at a transverse angle from the first planar section.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein.

DESCRIPTION OF THE ENABLING EMBODIMENT

Example embodiments will now be described more fully with reference to the accompanying drawings. In general, the subject embodiments are directed to a tray attachment assembly. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the views, the tray attachment assembly 20 is intended for extending or creating horizontal surface to place items. The tray attachment assembly 20 includes a tray 22 and a connection mechanism 24 for fixedly securing the tray 22 to an attachment surface 26, which could be a work surface, a table, a chair, or anything else that needs an additional horizontal surface space.

As illustrated throughout the Figures, the tray 22 includes a first planar section 28 delineated by a first lateral edge 30, a second lateral edge 32, and a pair of opposite longitudinal edges 34. The first planar section 28 has a top surface 36 providing the horizontal surface space for placement of items opposite a bottom surface 38 for attachment to the connection mechanism 24. A middle portion 40 of the tray 22 defines a recess 42 sunken into the top surface 36 and a corresponding bulge 44 in the bottom surface 38. The recess 42 thus serves to keep items from rolling off the tray 22 when in use and during movement between attachment surfaces 26. The middle portion 40 extends between the edges 30, 32, 34 and narrows from longitudinal edges 34 adjacent to the first lateral edge 30 to define a pair of connection surfaces 46. These connection surfaces 46 are neither bulged nor recessed from the top or bottom surfaces 36, 38 and provide a flat surface for attachment of the connection mechanism 24. The connection surfaces 46 extend from the first lateral edge 30 along opposite longitudinal edges 34 and define screw apertures 48 and counterbores. As such, part of the connection mechanism 24 abutting the bottom surface 38 is above the middle portion 40 of the top surface 36 for improved distribution of weight.

The tray 22 further includes a second planar section 50 functioning as a skirt to prevent unintended contact with the connection mechanism 24. The second planar section 50 extends from the second lateral edge 32 of the first planar section 28 at a transverse angle, preferably 75° to 105°, and more preferably 90°. The transition between the first planar section 28 and the second planar section 50 defines a rounded transition surface or bend 51. The second planar section 50 is disposed opposite from the connection surfaces 46 and extends downwardly from the first planar section 28 a first distance. The second planar section 50 includes rounded corners 53 to prevent harmful contact with a user. As will be appreciated with further reading, the first distance is greater than the downward extension of the connection mechanism 24 thus preventing unintended contact and disengagement of the connection mechanism 24. The second planar section 50 can alternatively provide a horizontal, usable surface when the orientation of the attachment surface 26 is vertical instead of horizontal.

Figure 1:
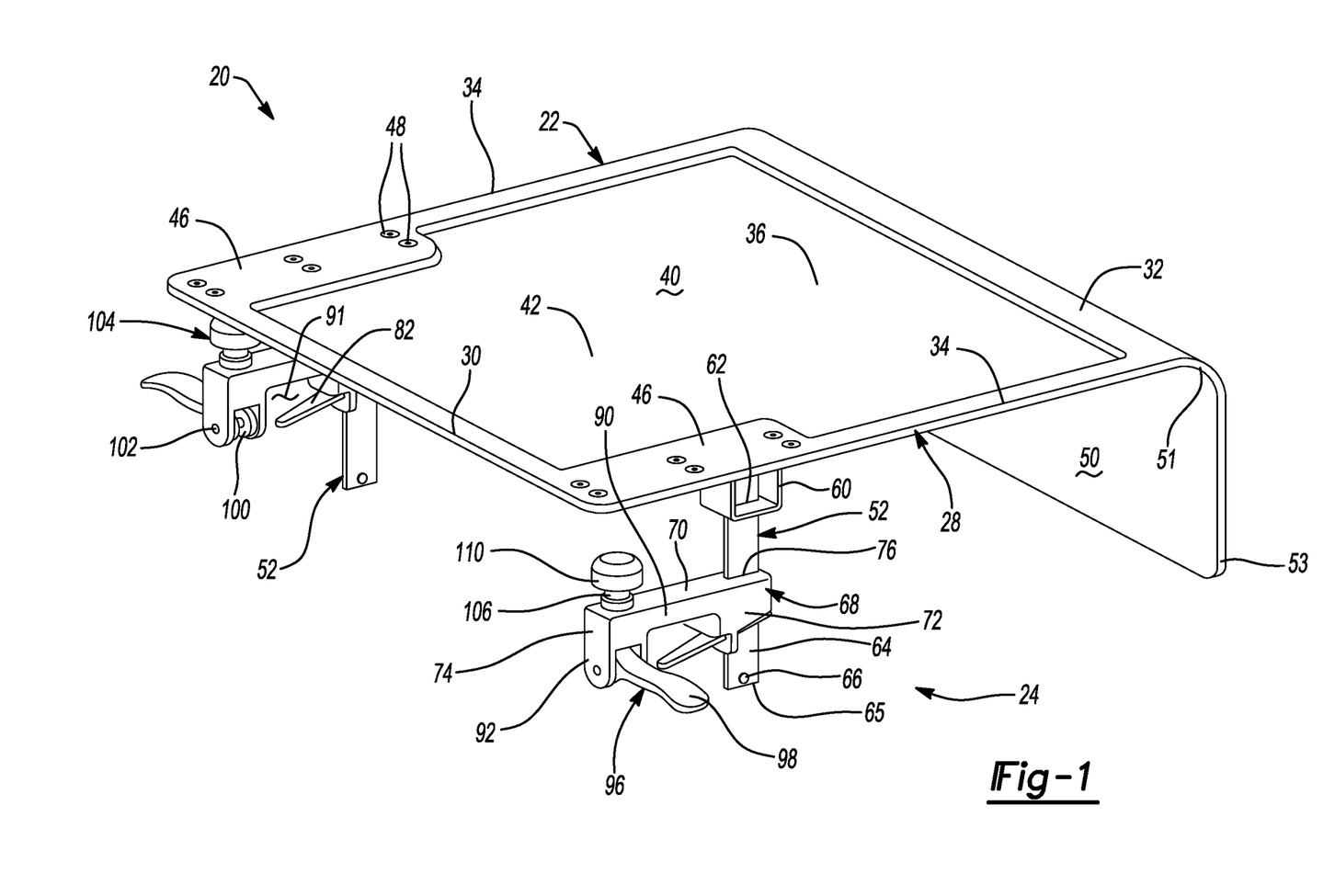
FIG. 1 is a perspective view of a tray attachment assembly.
Figure 2A:
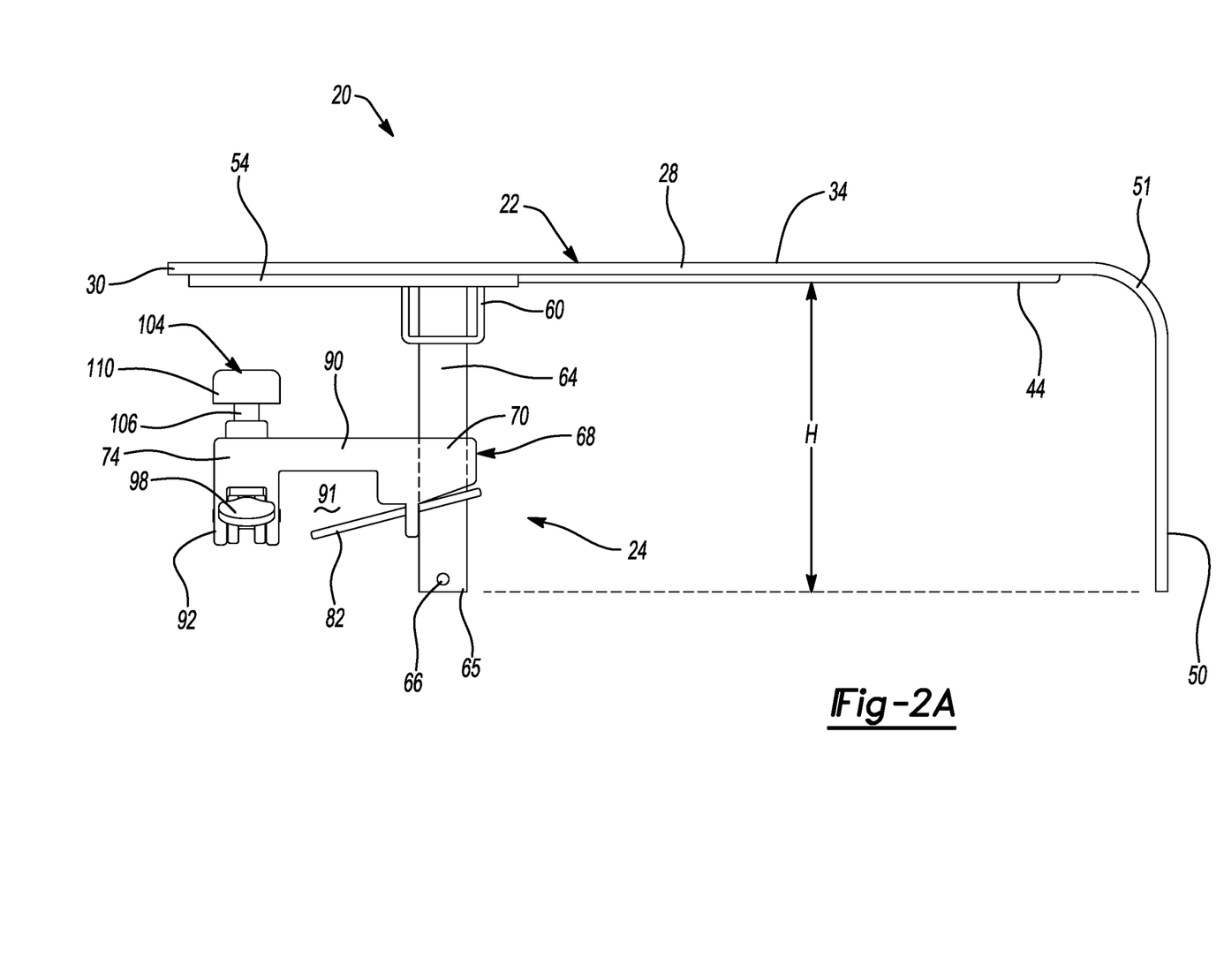
FIG. 2A is a side view of the tray attachment assembly.
Figure 2B:
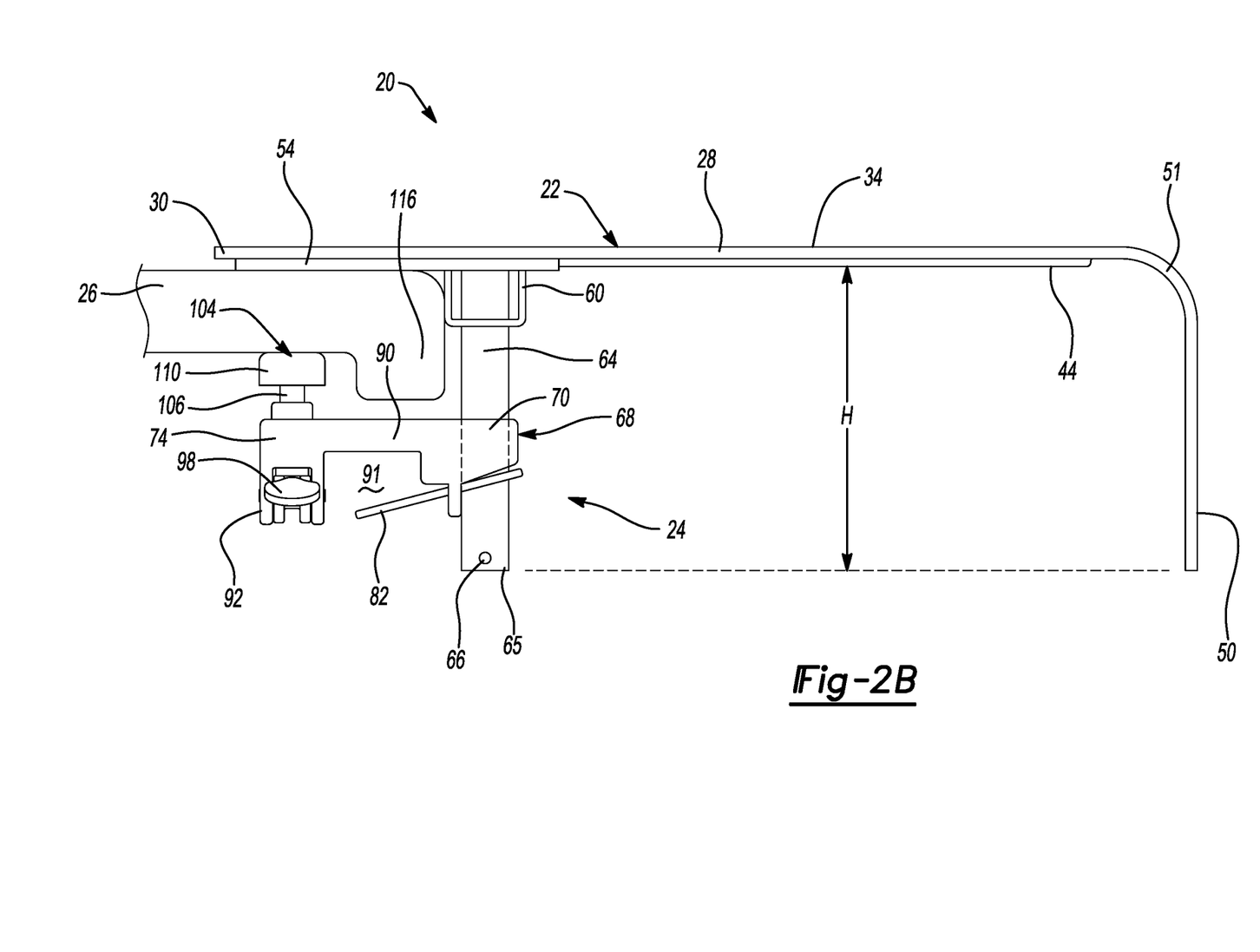
FIG. 2B is a side view of the tray attachment assembly fixedly secured on an attachment surface.
Figure 3:
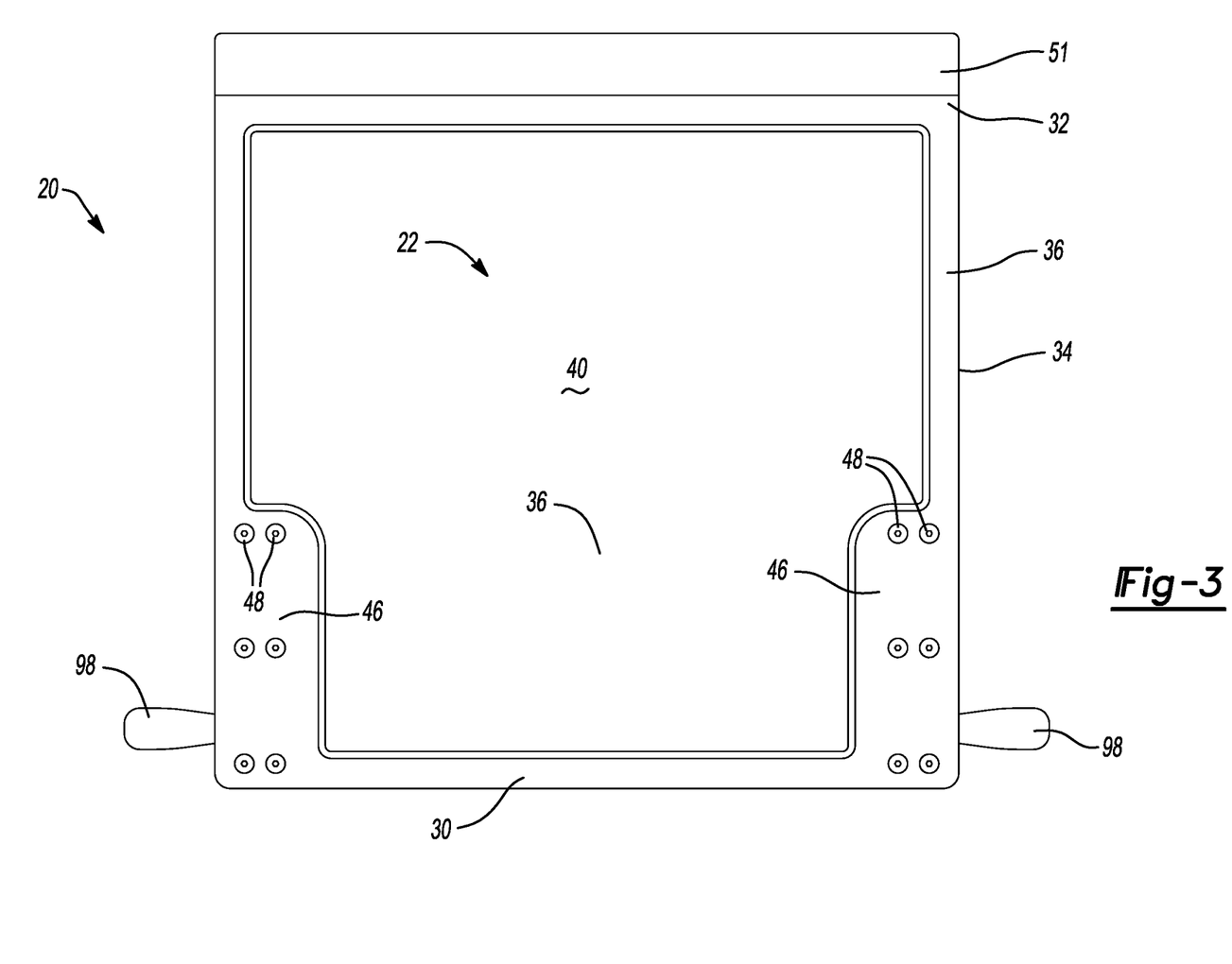
FIG. 3 is a top view of the tray attachment assembly.
Figure 4:
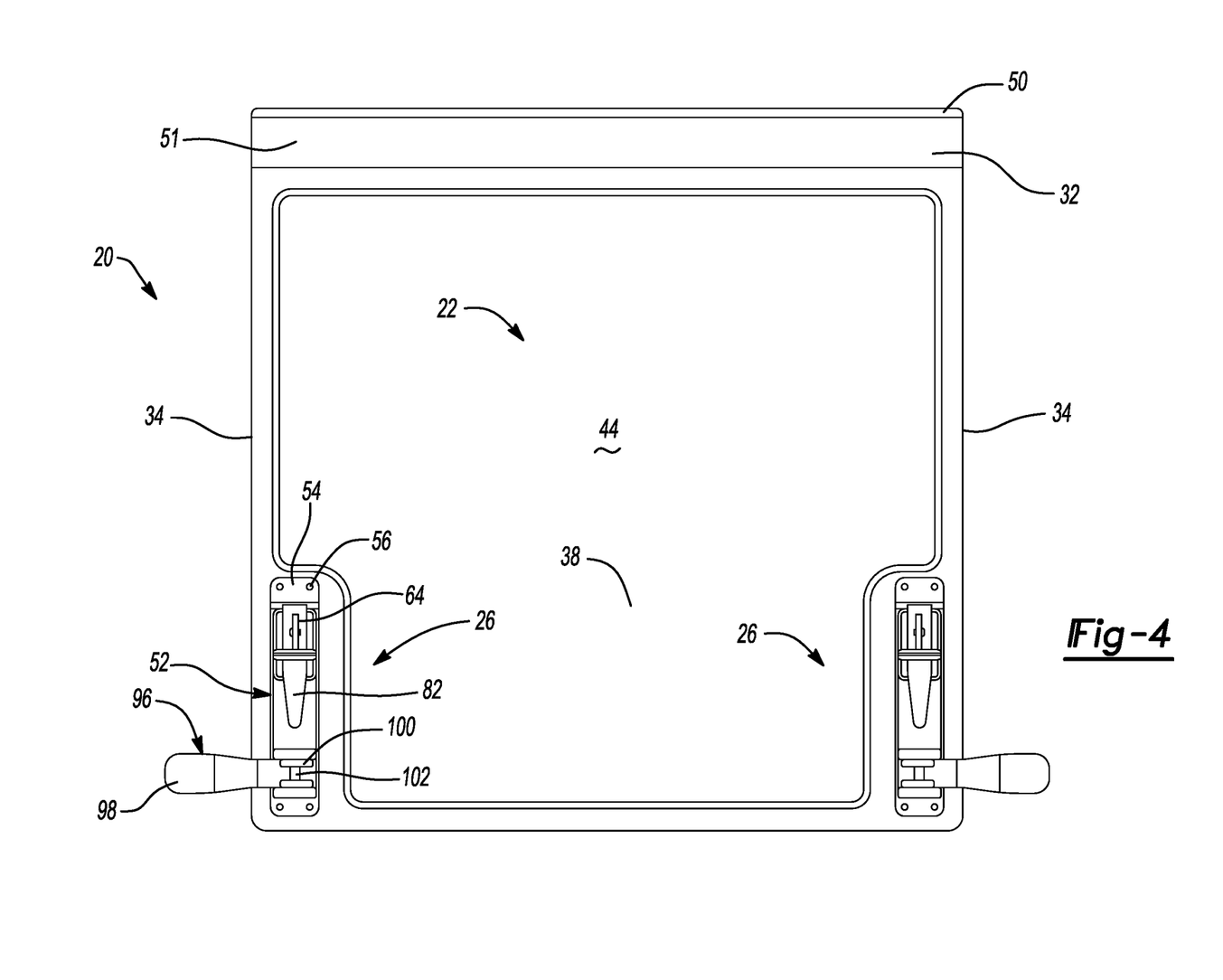
FIG. 4 is a bottom view of the tray attachment assembly.
Figure 5:
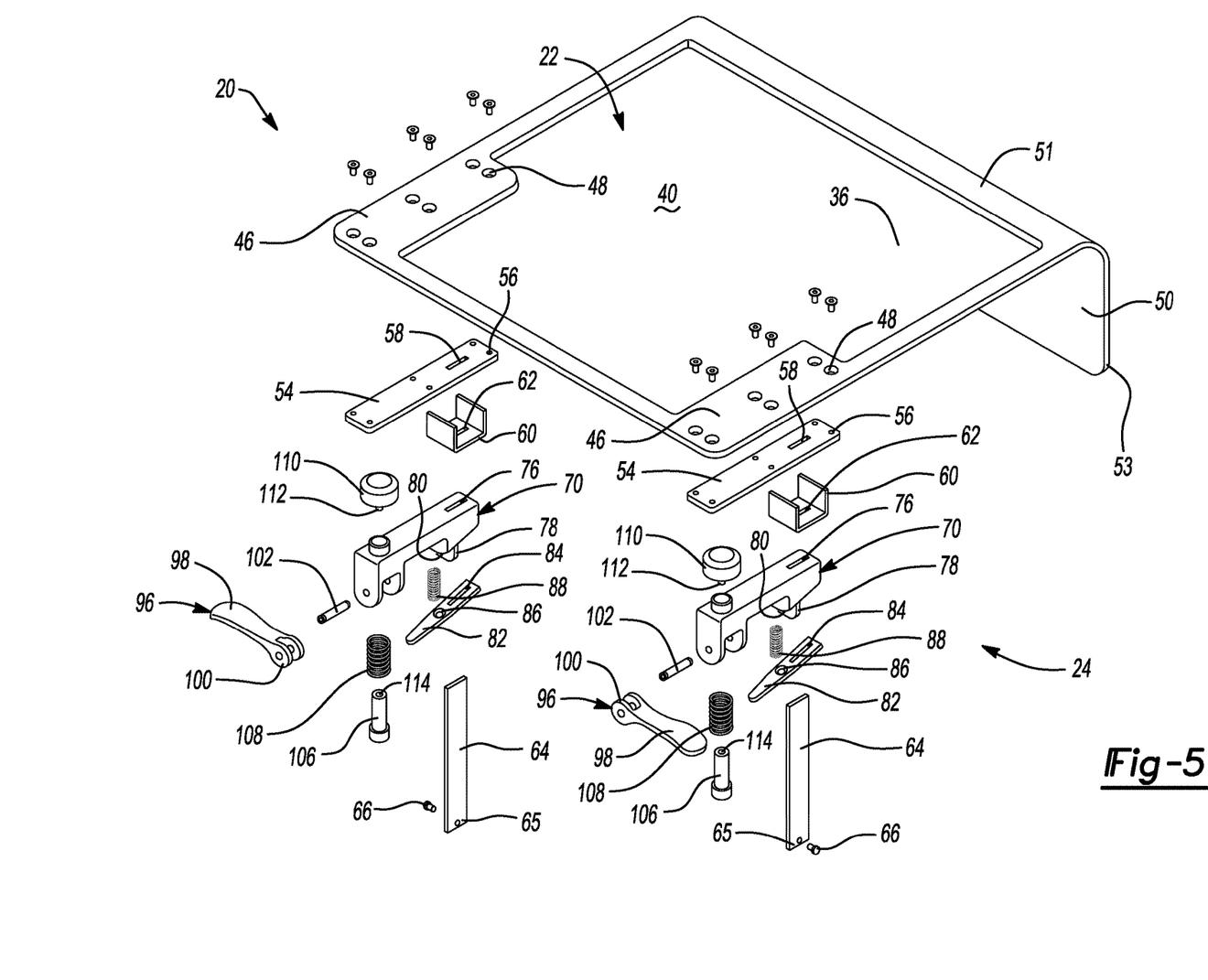
FIG. 5 is an exploded view of the tray attachment assembly.

The connection mechanism 24 is illustrated best in FIGS. 2 and 3 and includes at least one clamp assembly 52 but preferably two. If there is only one clamp assembly 52 it is located centrally. Each clamp assembly 52 includes a reinforcement plate 54 attached to the bottom surface 38 of the tray 22 against one of the connection surfaces 46. The reinforcement plate 54 preferably comprises steel, includes screw holes 56 for alignment and connection with the screw apertures 48 of the connection surface 46, and includes a first slot 58. A bracket 60 has a generally U-shape, is connected to the reinforcement plate 54, and includes a second slot 62 in axial alignment with the first slot 58. An elongated track 64 is disposed in the first and second slots 58, 62 and reinforced by the bracket 60. The elongated track 64 extends from the slots 58, 62 to a distal end 65. The distal end 65 extends downwardly from the tray 22 and terminates a second distance from the tray 22 that is equal to or smaller than the first distance of the second planar section 50. The distal end 65 includes a dimple pin 66 extending therethrough. The reinforcement plate 54, bracket 60, and elongated track 64 can be pre-welded as a one-piece unit or provided in separate and connectable parts.

A locking assembly 68 is disposed on and is slideable along the elongated track 64 between the bracket 60 and the dimple pin 66. The locking assembly 68 includes an arm 70 extending between an inward adjustment portion 72 and an outward clamping portion 74. The inward adjustment portion 72 defines an arm slot 76 for slidable connection to the elongated track 64. The inward adjustment portion 72 further includes a trigger retaining portion 78 and a spring retaining portion 80. A trigger 82 having a trigger slot 84 that is slidably connected to the elongated track 64 extends from the trigger retaining portion 78 of the arm 70. The trigger 82 is pivotable with respect to the trigger retaining portion 78 and when it extends perpendicularly from the elongated track 64, the trigger slot 84 is loose on the elongated track 64 to allow axial slidable movement with the arm 70 in an unrestrained condition. The trigger 82 further includes a spring recess 86 adjacent to the spring retaining portion 80 of the arm 70. A spring 88 is disposed in the spring retaining portion 80 and seats in the spring recess 86, urging the trigger 82 at a transverse angle from the elongated track 64 to lock it and the arm 70 in a restrained condition thus preventing slidable movement of the arm 70. Accordingly, a user can push the trigger 82 against the biasing spring 88 until the trigger 82 is perpendicular to the elongated track 64 in the unrestrained condition and slide the arm 70 to adjust it to attachment surfaces 26 having a variety of widths. Because there are two clamp assemblies 52, each arm 70 can be independently adjusted for non-uniform connection surfaces 26.

The arm 70 of the locking assembly 68 further includes a middle arm portion 90 that connects the inward adjustment portion 72 and the outward clamping portion 74. The middle arm portion 90 is narrow and provides a space 91 for allowing the trigger 82 to pivot upwardly. The outward clamping portion 74 includes a handle bracket 92 and a foot-holding aperture 94. A handle 96 is connected to the handle bracket 92 and includes a gripping portion 98 and a cam portion 100. A pin 102 extends through the handle bracket 92 and centrally through the cam portion 100 to allow rotation of the handle 96 with respect to the handle bracket 92.

The foot-holding aperture 94 of the arm 70 retains a foot 104 that includes a post 106 disposed through the foot-holding aperture 94. The post 106 includes a stepped bottom portion. A foot spring 108 extends about the post 106 and against the stepped bottom portion to urge it downward into engagement with the cam portion 100 of the handle 96. A pad 110 is disposed on the post 106 at a side opposite the cam portion 100 and provides a soft elastic contact for the attachment surface 26. The cam portion 100 is ramped such that rotation of the handle 96 overcomes the force of the foot spring 108, urging the post 106 upwardly and pressing the pad 110 against the attachment surface 26. The pad 110 includes a threaded bolt 112 and the post 106 includes a corresponding threaded aperture 114 such that pads 110 from different clamp assemblies 52 can be individually adjusted for additional refinements, particularly when an attachment surface 26 has a lip 116 that would otherwise prevent connection.

In operation, the tray attachment assembly 20 provides multiple adjustment mechanisms for adapting to varying sizes and shapes of connection surfaces 26. One of these adjustment mechanisms is illustrated in FIG. 2B and includes the arms 70 of the clamp assemblies 52 that can be individually adjusted along the elongated track 64 for complying with connection surfaces 26 widths. Once in compliance, another adjustment mechanism that includes the foot 104 of each respective clamp assembly 52 can be further adjusted to bypass a lip 116 or other structural feature of the attachment surface 26 that could negatively affect the connection. The next adjustment mechanism includes the handles 96 that can be rotated such that the cam portion 100 contacts the post 106 and pushes it upwardly to clamp the attachment surface 26 between the pad 100 and reinforcement plate 54. In accordance with these adjustment mechanisms, the tray attachment assembly 20 can be connected to any number of attachment surfaces having varying structural properties. In addition, it should be appreciated with specific reference to FIG. 2B, that preferably the second planar section 53 and the elongated track 64 extend from the first planar section 28 at an equal distance H. In operation, when the tray assembly 20 is removed from the attachment surface 26, it can be set directly down on a semi-flat surface and the elongated tracks 64 and second planar section 53 can support the first planar section 28 such that it remains flat. As such, items on the tray assembly 20 can remain there during detachment and setting the tray assembly 20 down. In certain arrangements, the trigger retaining portion 78 can be larger such that as the arm 70 is moved towards the distal end 65, the trigger retaining portion 78 extends beyond the distance H such that the tray assembly 20 can remain flat even on an inclined or non-flat surface. It should be appreciated that other portions of the arm 70 can alternatively extend beyond the distance H. Whichever portion of the arm 70 that extends the furthest, may be padded with a softer material such as rubber.

Figure 6:
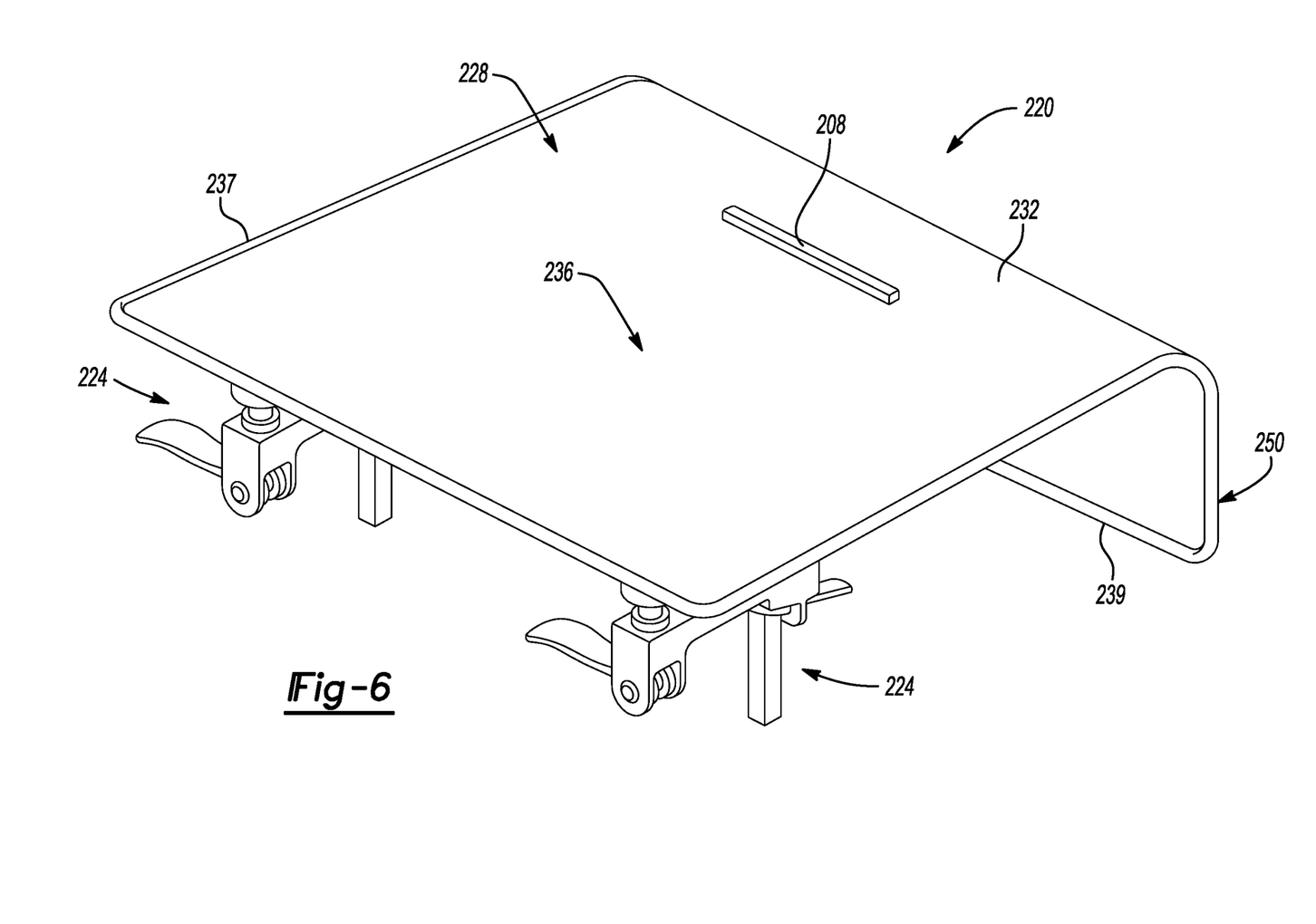
FIG. 6 is a perspective view of the tray attachment assembly in accordance with another embodiment.
Figure 7A:
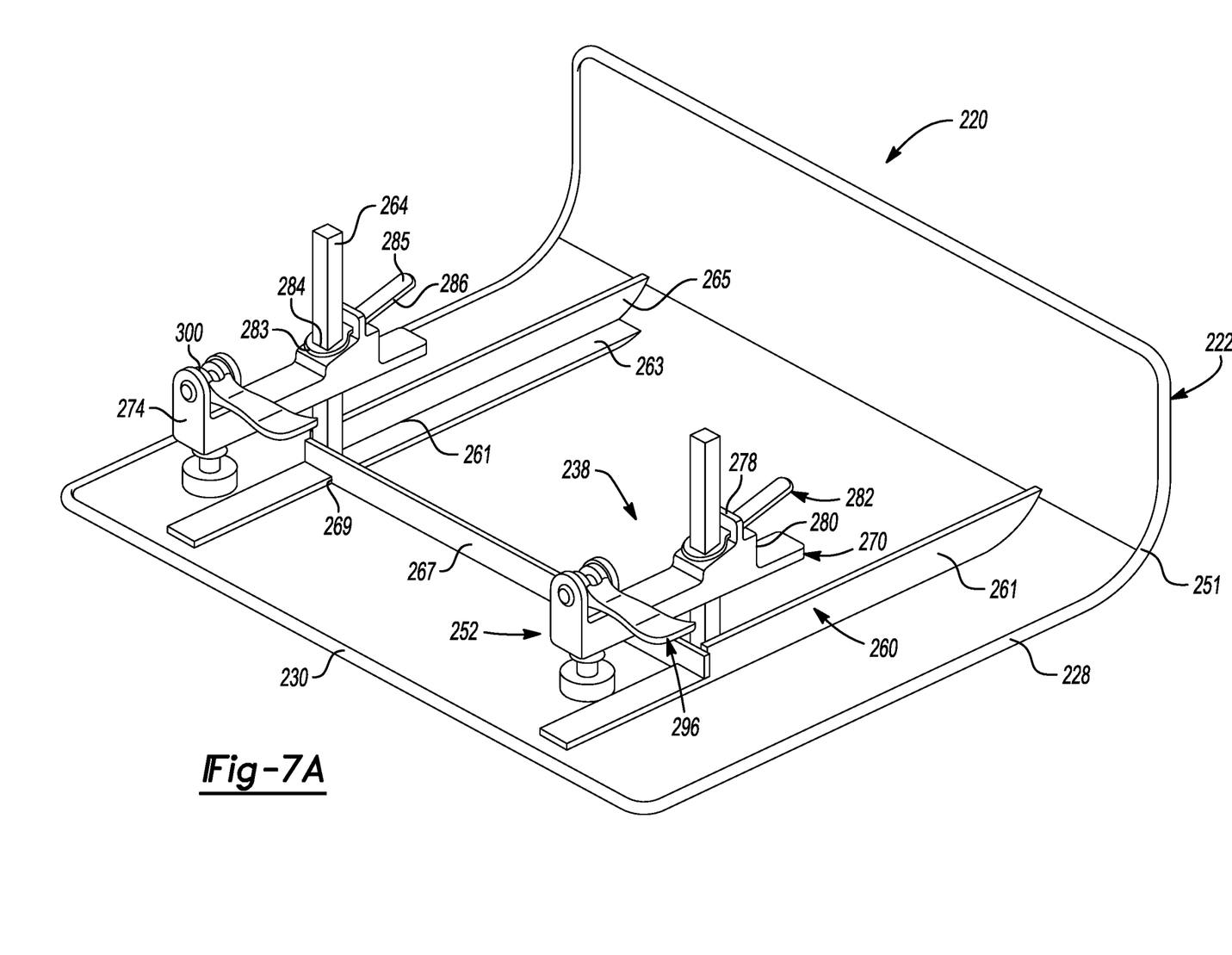
FIGS. 7A and 7B are a bottom views of the tray attachment assembly.

FIGS. 6 and 7A illustrate another embodiment of the tray assembly 220 having a modified first planar section 228 and connection mechanism 224. As shown, the first planar section 228 has a top surface 236 that is substantially planar. The top surface 236 can be smooth or uneven (e.g., diamond plate, knurled, grooved) and can be hard or soft (e.g., plastic, metal, rubber) for selected uses. A horizontal support 208 extends along the second lateral edge 232 of the first planar section 228, adjacent to the second planar section 250. The horizontal support 208 can be used to retain objects from sliding off the second later edge 232 such as writing utensils, books, tablets, and laptops. A rim 237 extends around the entire outer edge of the first and second planar sections 228, 250. It is preferable that in certain embodiments the rim 237 comprises a softer material such as rubber. The rim 237 both retains objects on the tray 222 and also prevents harm to a user from unintended contact with the second planar section 250. The rim 237 may include a thicker portion along the bottom edge 239 between the rounded corners 253 for increased protection.

Referring now specifically to FIG. 7A, the bottom surface 238 of the first planar section 228 has a bracket 260 that includes two longitudinal supports 261. Each longitudinal support 261 includes a flat beam 263 extending from the first lateral edge 230 and tapers into the rounded transition 251. A vertical beam 265 extends along part of the each flat beam 263 at a right angle and also tapers into the rounded transition 251. A lateral support 267 extends between longitudinal supports 261. The lateral support 267 abuts ends of the vertical beams 265 and includes steps 269 that seat over the flat beams 263. One or both of the longitudinal supports 261 and lateral supports 267 may be integral with the tray 222.

The elongated track 264 of the modified connection mechanism 224 has a square cross-section and is attached directly to the bottom surface 238 of the first planar section 28. However, the elongated track 264 could include other cross-sectional shapes such as hexagonal or circular. The elongated track 264 axially abuts the flat beam 263 and sits against a right angle joint between the vertical beam 265 and lateral support 267. A modified trigger 282 includes an enlarged trigger 282 and trigger slot 284. The trigger slot 284 is surrounded by a circular portion 283 that extends to an elongated portion 285. The trigger 282 is pivotable with respect to the trigger retaining portion 278 of the arm 270 and when it extends perpendicularly from the elongated track 264, the trigger slot 284 is loose on the elongated track 264 to allow axial slidable movement with the arm 270 in an unrestrained condition. The trigger retaining portion 278 is disposed on the opposite side of the elongated track 264 from the previous embodiment such that the trigger 282 extends away from the outward clamping portion 274. The trigger 282 further includes a spring recess 286 (similar in size and shape to spring recess 86) adjacent to the spring retaining portion 280 of the arm 270. The ramp of the cam portion 300 of each handle 296 can be arranged such that rotation of the handle 296 associated with tightening can be in the same or opposite directions between handles 296. As shown in the exemplary embodiment in FIG. 7A, the handles 296 are assembled to rotate in the same direction to tighten.

Figures 7B, 8:
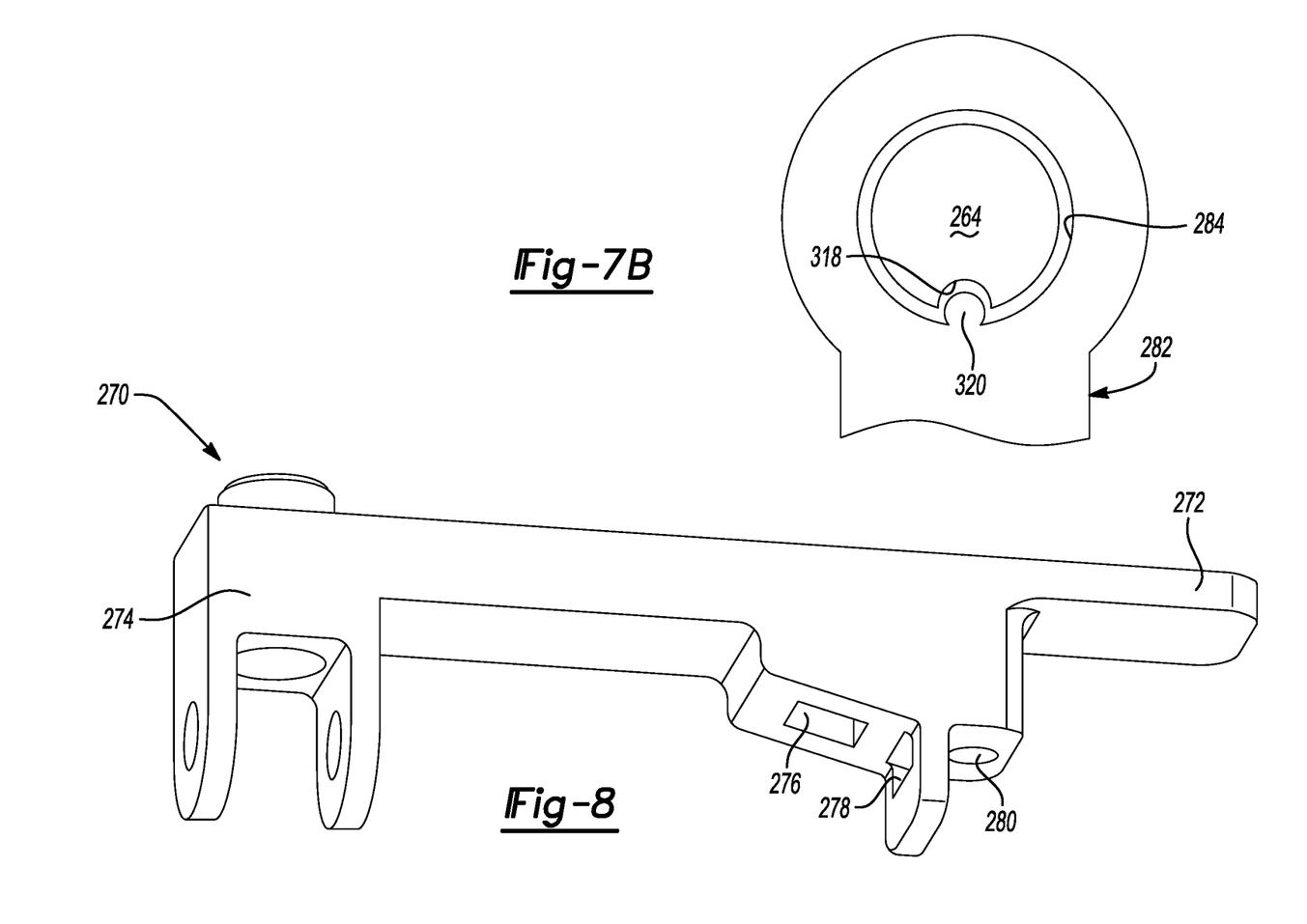
FIG. 8 is a perspective view of a locking assembly used in conjunction with the tray assembly in certain embodiments.

If the elongated track 264 is circular, as illustrated in 7B, it defines a channel 318 that extends lengthwise and the trigger 282 includes at least one projection 320 that enters into the channel 318 and prevents rotation of the connection mechanism 224 with respect thereto. However, while primarily used in embodiments having a circular elongated track 264, the channel 218 and at least one projection 320 can be incorporated in various other shapes including those described herein.

FIG. 8 illustrates a perspective view of the arm 270 used in combination with certain embodiments. The arm 270 extends between an inward adjustment portion 272 and an outward clamping portion 274. The inward adjustment portion 272 defines an arm slot 276 having a rectangular shape for slidable connection to the elongated track 264. The inward adjustment portion 272 further includes a trigger retaining portion 278 and a spring retaining portion 280. The trigger 282 extends towards the second planar section 250 and is pivotable with respect to the trigger retaining portion 278 and when it extends perpendicularly from the elongated track 264, the trigger slot 284 is loose on the elongated track 264 to allow axial slidable movement with the arm 270 in an unrestrained condition. A spring (not shown) is disposed in the spring retaining portion 280 and the spring recess 286 and urges the trigger 282 at a transverse angle from the elongated track 264 to lock it and the arm 270 in a restrained condition thus preventing slidable movement of the arm 270. Similarly to the previous embodiment, a user can push the trigger 282 against the biasing spring until the trigger 282 is perpendicular to the elongated track 264 in the unrestrained condition and slide the arm 270 to adjust it to attachment surfaces 26 having a variety of widths. Because there are two clamp assemblies 252, each arm 70 can be independently adjusted for non-uniform connection surfaces 26.

Figures 9, 10:
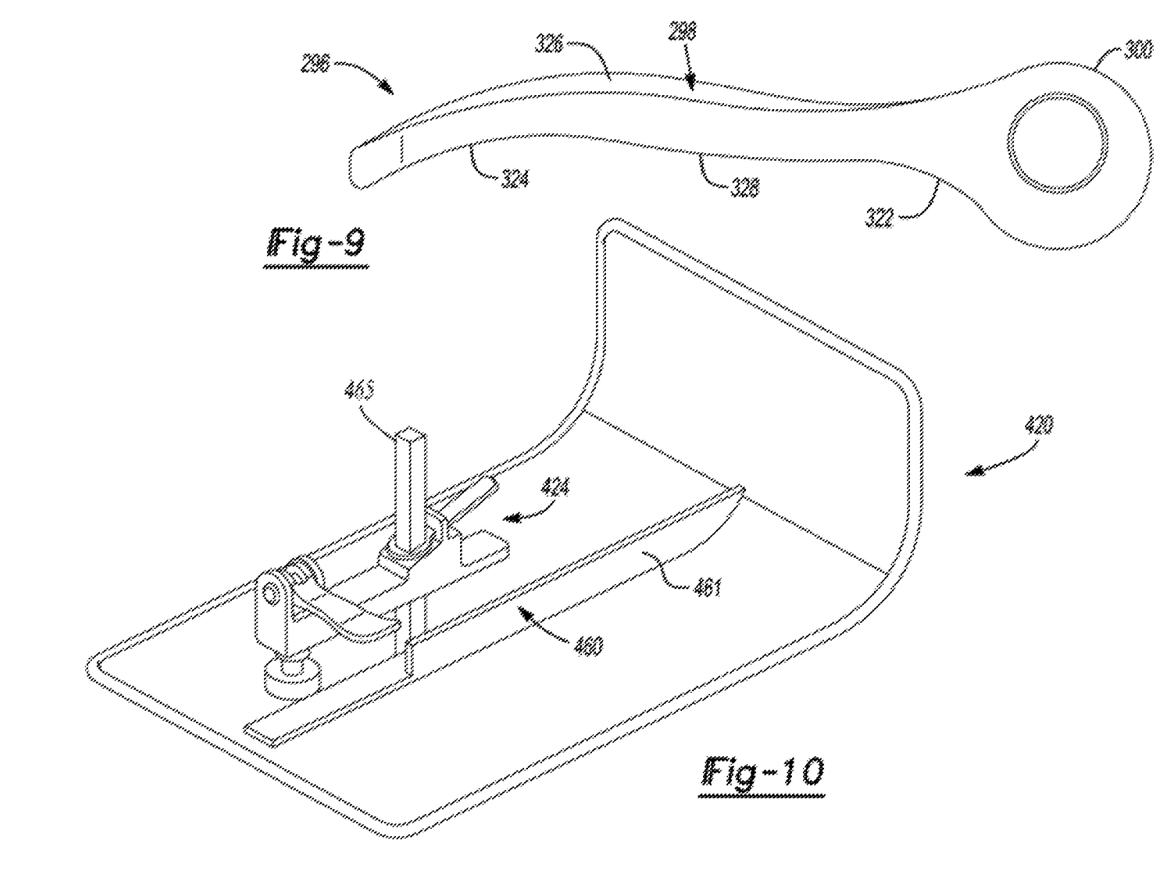
FIG. 9 is a side view of a handle used in conjunction with certain embodiments.
FIG. 10 is a bottom view of a tray assembly in accordance to yet another embodiment.

A closer view of the handle 296 is shown in FIG. 9. The handle 296 includes a gripping portion 298 that provides ergonomics. The gripping portion 298 includes a first curve 322 and a second curve 324 spaced by a third curve 326 extending in the opposite direction as the first and second curves 322, 324. The handle 296 further includes a top surface portion 326 that bulges outwardly and corresponds to a grooved bottom surface 328.

FIG. 10 illustrates an alternative embodiment of the tray assembly 420 that includes only one connection mechanism 424 spaced centrally between the longitudinal edges 434. A modified bracket 460 includes one longitudinal support 461. The elongated track 464 includes a boot 465 that protects a user from harmful contact and also prevents scraping if the tray assembly 420 is removed from the attachment surface 26 and placed directly thereon. The boot 465 can also be included in other embodiments having two connection mechanisms. The embodiments having one connection mechanism 424 centrally located are particularly useful for corners of the work surface 26.

Figure 11:
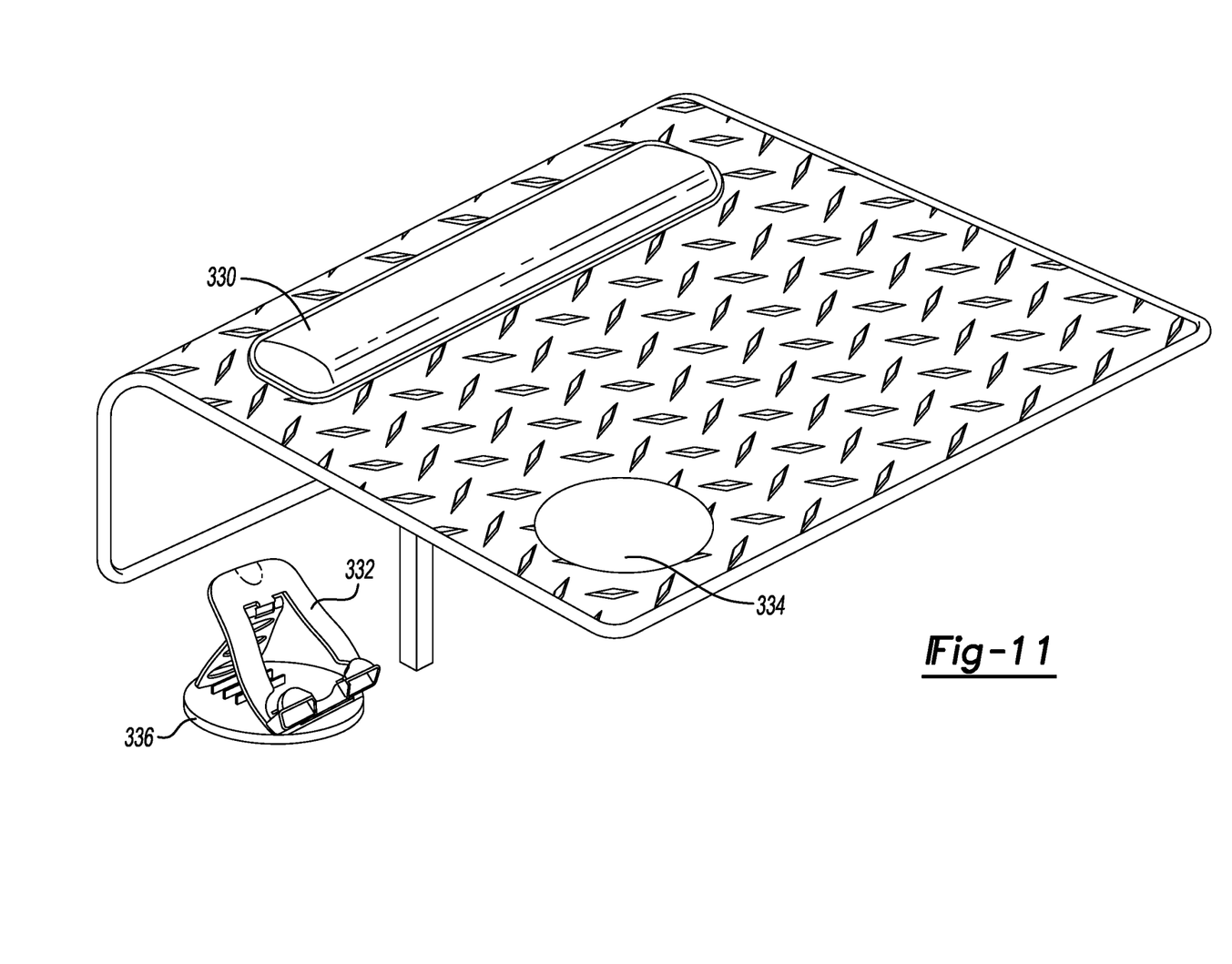
FIG. 11 is a perspective view of a tray assembly with features used in accordance with certain embodiments.
Figure 12:
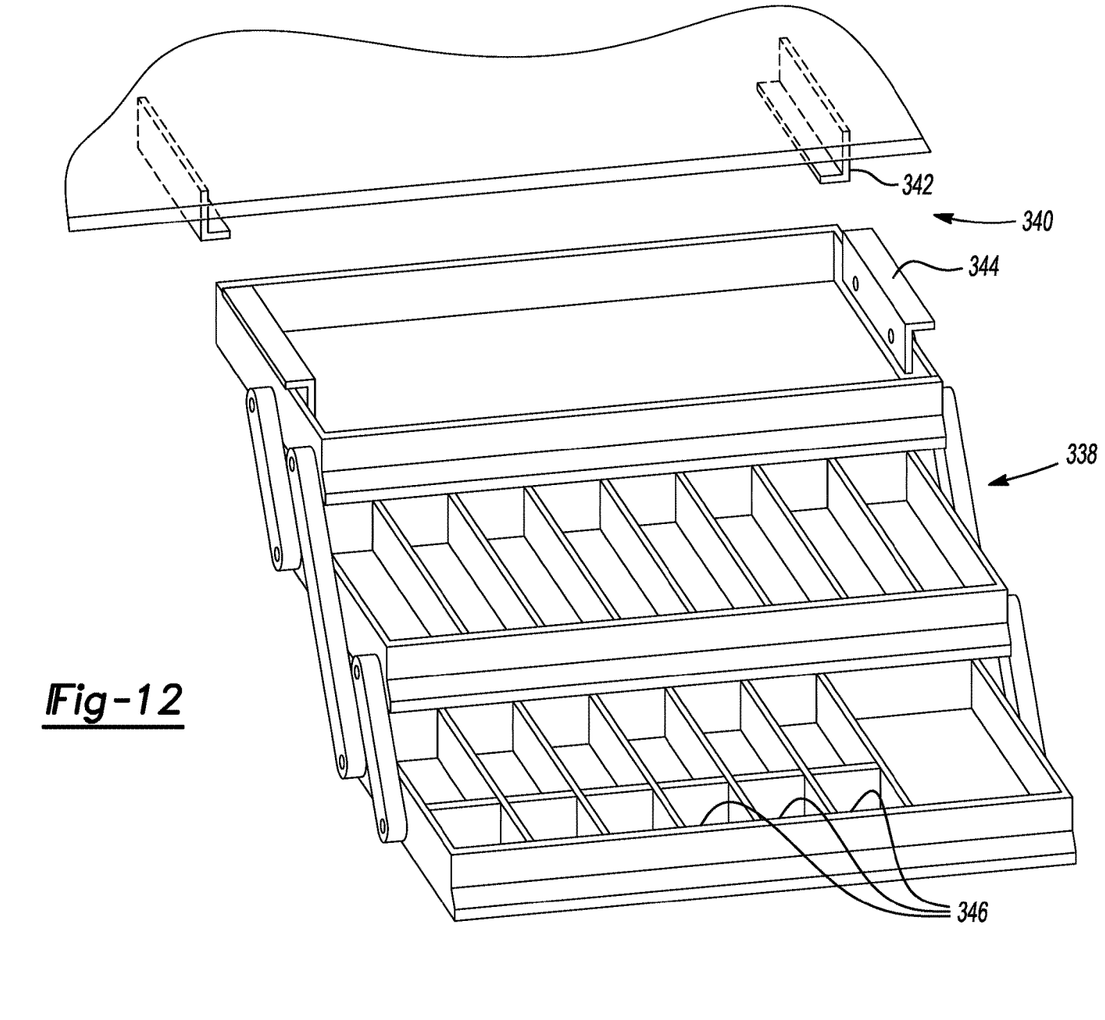
FIG. 12 is a bottom perspective view of a tray assembly including a foldable drawer.

As shown in FIGS. 11 and 12, the tray assembly 20, 220, 420 may include other various features. A wrist support 330 extends along the second lateral edge 32, 232 of the first planar section 28, 228, adjacent to the second planar section 50, 250. The wrist support 330 can be used without or in addition to the horizontal support 208. The tray assembly 20, 220 may also include a swivel attachment 332 for a cell phone or tablet. The swivel attachment 332 may be permanently or releasable attached to the top surface 36. For example, in embodiments wherein the top surface 36 is not smooth, a designated corner portion 334 may be smooth so that the swivel attachment 332 can be attached with a suction cup 336.

A foldable drawer 338 can be permanently or removable attached to the bottom surface 38 of the first planar section 28. When the drawer 338 is removably attachable, a corresponding fastening mechanism 340 can be attached to the bottom surface 38 and the drawer 338. In one example embodiment, the fastening mechanism 340 includes a track 342 disposed on the first planar section 28 for mating with a corresponding drawer tab 344 for selective attachment. The drawer 338 preferably hinges outwardly passed the first lateral edge 30 to expose a plurality of compartments 346 for storage. When the drawer 338 is folded under the first planar section 28 it preferably extends downwardly at a distance less than H.

Obviously, many modifications and variations of the present invention are possible in light of the above teachings and may be practiced otherwise than as specifically described. In addition, the reference numerals are merely for convenience and are not to be read in any way as limiting. Note that not all of the activities described above in the general description or the examples are required, that a portion of a specific activity may not be required, and that one or more further activities may be performed in addition to those described. The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Furthermore, certain features are, for clarity, described herein in the context of separate embodiments, may also be provided in combination in a single embodiment. Conversely, various features that are, for brevity, described in the context of a single embodiment, may also be provided separately or in any sub combination.

What is claimed is:

1. A tray attachment assembly for providing a horizontal surface to hold items comprising:
   a tray defining the horizontal surface and a connection mechanism for fixedly clamping said tray to an attachment surface;
   said tray including a first planar section extending between a first lateral edge and a second lateral edge delimiting the horizontal surface;
   said connection mechanism including at least one clamp assembly extending adjacent to said first lateral edge, said at least one clamp assembly including an elongated track extending vertically from a bottom surface of said first planar section;
   an arm connected to and extending from said elongated track having an unrestrained condition wherein said arm can slide along said elongated track and a restrained condition wherein said arm cannot slide along said elongated track;
   said arm including a post spaced horizontally from said elongated track towards said first lateral edge of said first planar section wherein said post is vertically adjustable towards and away from said first planar section independently from said elongated track; and
   wherein said elongated track is connected to said first planar section with a bracket having a generally U-shape spaced from said first planar section, said bracket being connected to a reinforcement plate fastened to said first planar section wherein said reinforcement plate includes a first slot for receiving said elongated track and said bracket includes a second slot aligned with and spaced from the first slot for receiving said elongated track.

2. An assembly as set forth in claim 1, further including a second planar section extending from said second lateral edge of said first planar section at a transverse angle from said first planar section.

3. An assembly as set forth in claim 2, wherein said second planar section extends downwardly a first distance from said first planar section and said elongated track extends downwardly a second distance from said first planar section and wherein said first distance is not less than said second distance for preventing unwanted contact with said elongated track.

4. An assembly as set forth in claim 2, wherein said first planar section includes a top surface for placement of items spaced from said bottom surface and said first planar section further includes a raised rim along said edge disposed between said bottom surface and said top surface.

5. An assembly as set forth in claim 4, wherein said raised rim further extends around an edge of said second planar section and at least part of said raised rim around said edge of said second planar section comprises material softer than said first planar section and said second planar section.

6. An assembly as set forth in claim 1, wherein said raised rim includes a widened portion adjacent to and perpendicular said the first lateral edge to define a flat connection surface underneath for attachment of said reinforcement plate.

7. An assembly as set forth in claim 1, wherein said at least one clamp assembly includes a second clamp assembly spaced therefrom and adjacent to said first lateral edge.

8. An assembly as set forth in claim 7, wherein said second clamp assembly comprises:
   a second elongated track extending vertically from a bottom surface of said first planar section and a second arm connected to and extending from said second elongated track having an unrestrained condition wherein said second arm can slide along said second elongated track and a restrained condition wherein said second arm cannot slide along said second elongated track; and
   said second arm including a second post spaced horizontally from said elongated track towards said first lateral edge of said first planar section wherein said second post is vertically adjustable towards and away from said first planar section independently from said second elongated track such that said angle of said first planar section can be adjusted during attachment to the attachment surface.

9. An assembly as set forth in claim 1, wherein said post is in contact with a handle having a cam portion that is ramped and rotation of said handle moves said post vertically with respect to said tray.

10. An assembly as set forth in claim 9, wherein said post includes a pad for direct contact with the attachment surface, said pad having a threaded bolt and said post having a correspondingly threaded aperture for receiving and axially adjusting said pad with respect to said post.

11. An assembly as set forth in claim 10, wherein said pad comprises soft and elastic material for preventing damage to the attachment surface when said tray attachment assembly is attached thereto.

12. An assembly as set forth in claim 2, wherein said second planar section includes rounded corners for preventing harmful contact with a user.

13. An assembly as set forth in claim 1, wherein said first planar section includes a top surface having a predominately non-smooth and textured surface that delimits a smooth portion providing a smooth planar section for attachment of a suction cup.

14. An assembly as set forth in claim 13, wherein said suction cup attaches a swivel attachment to said top surface for holding to a phone or tablet.

15. An assembly set forth in claim 1 including a drawer and wherein said bottom surface includes a track for releasably attaching said drawer, said drawer including an expanded condition wherein it is hinged outwardly past said first lateral edge to make accessible a plurality of compartments and said drawer further including a retracted position wherein said drawer is hinged inwardly and said plurality of compartments are non-accessible.

* * * * *